April 22, 1952 N. MARCUS 2,593,587
DISTANT READING LIQUID RESERVOIR GAUGE
Filed April 20, 1948 2 SHEETS—SHEET 1
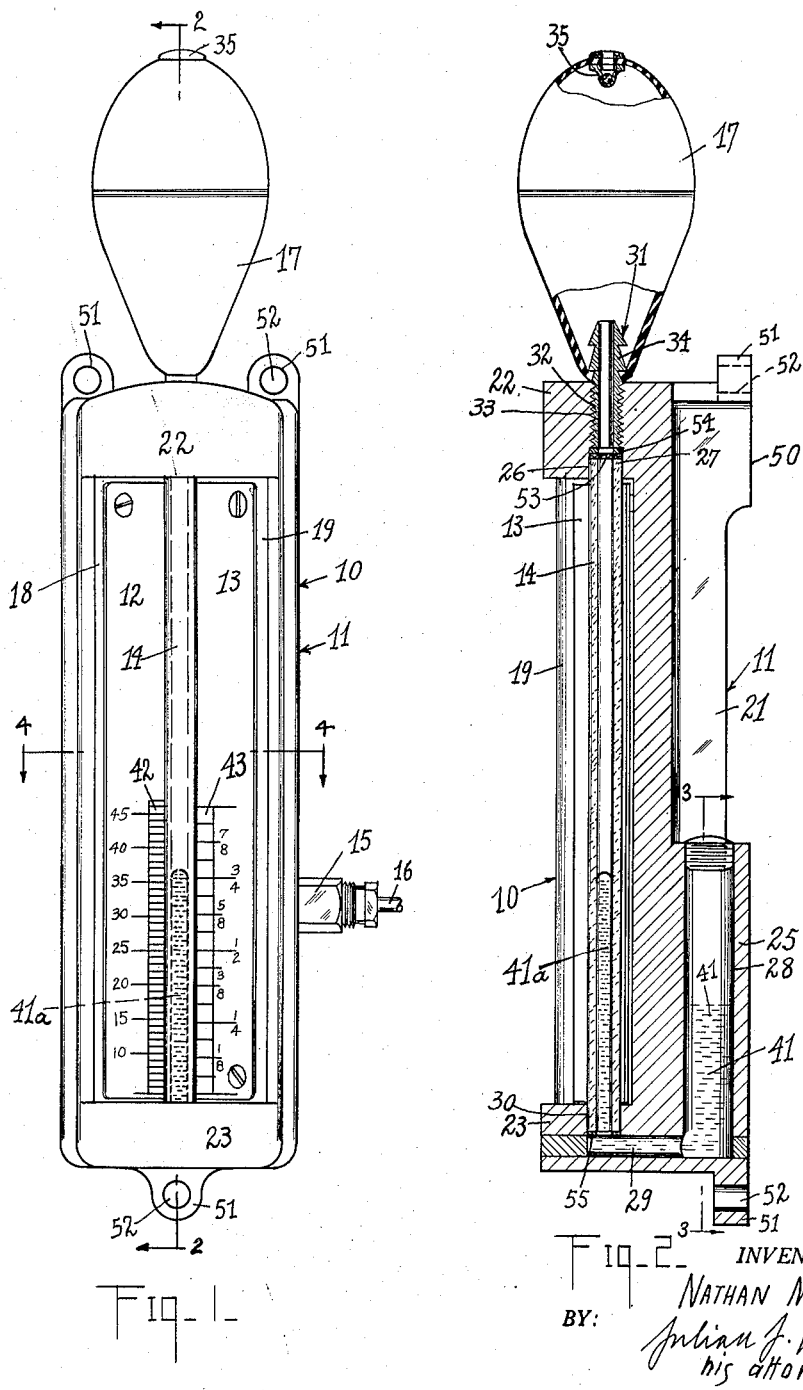
INVENTOR:
NATHAN MARCUS,
BY: Julian J. Wittal
his attorney.

April 22, 1952 N. MARCUS 2,593,587
DISTANT READING LIQUID RESERVOIR GAUGE
Filed April 20, 1948 2 SHEETS—SHEET 2
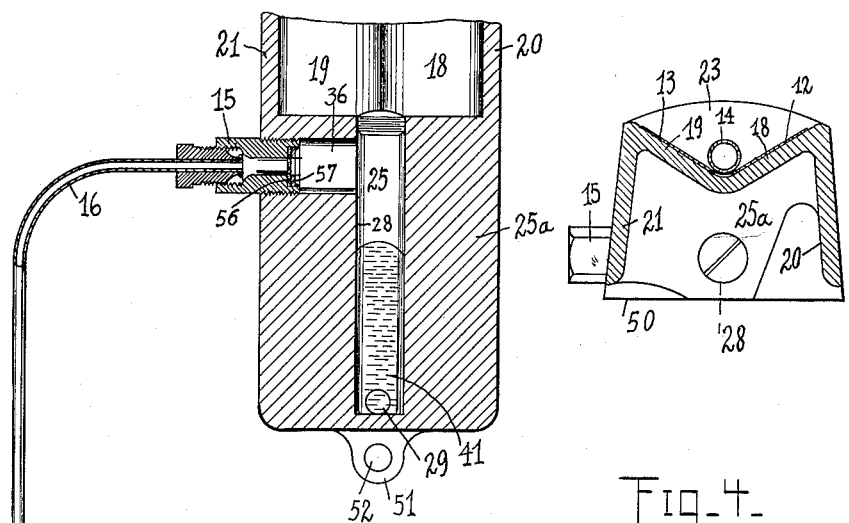
Fig. 4.
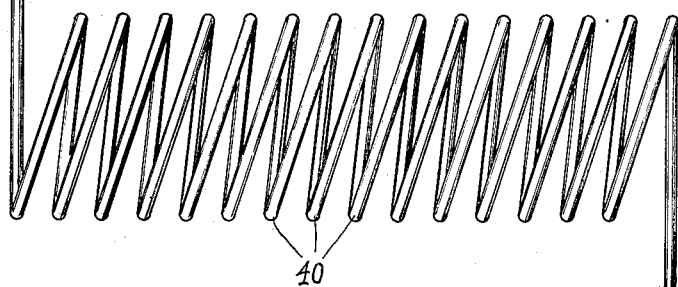
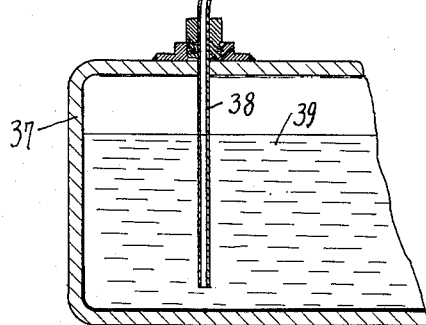
Fig. 3.
NATHAN MARCUS,
INVENTOR.
BY: Julian J. Wittal,
his attorney.

Patented Apr. 22, 1952

2,593,587

UNITED STATES PATENT OFFICE 2,593,587

DISTANT READING LIQUID RESERVOIR GAUGE

Nathan Marcus, Union City, N. J.

Application April 20, 1948, Serial No. 22,226

5 Claims. (Cl. 73—302)

1

This invention relates to distant reading gauges for reservoirs for liquids, particularly for fuel oil, and has for its main object to provide a device of this character, which will be more efficient in use, easier to employ and to manipulate, than such devices now in use or heretofore proposed.

Other objects of this invention will be apparent as the specification of the same proceeds, or will be pointed out therein.

In the drawings forming a part of this specification and accompanying the same:

Fig. 1 is a front elevational view of my device, while

Fig. 2 is a sectional view thereof, the section generally being taken on the line 2—2 of Fig. 1;

Fig. 3 is a fragmentary sectional view of the lower part of my device on a larger scale than the earlier figures, the section being taken as indicated at 3—3 in Fig. 2, and a liquid reservoir and the usual long narrow pipe connection from the same to the distant gauge also being indicated in the figure in a diagrammatic manner;

Fig. 4 is a transverse sectional view, the section being taken on the line 4—4 of Fig. 1.

Referring now to the drawings more in detail by characters of reference, the numeral 10 indicates my novel distant reading gauge, in general, the same being composed of five main elements, a frame structure with angularly placed front plates, generally indicated by the numeral 11, two gauges proper 12 and 13 secured on said front angular plates, an indicator tube 14 placed at the meeting of the angular plates and reading gauges proper, a connection member 15 for the tube 16 leading to the liquid reservoir to be gauged, and finally a resilient bag 17 at the top of the device in connection with the tube 14 to clear and adjust part of my device when necessary.

The frame 11 may be made of an appropriate cast metal, and will have the mentioned two angularly placed front plate members 18 and 19, two rearward side plates 20 and 21, an upper transverse member 22 closing the top of the device, and a lower transverse member 23 closing the bottom of it between the two angular front plates. In the rear of the lower portion of the frame, a container member 25 is formed by filling in the lower part between the side plates and the two front plates, as best indicated at 25a in Figs. 3 and 4.

A bore 26 is drilled through the upper cross member 22 adapted to receive the upper end of the tube 14, as indicated at 27.

2

In the container member 25, a substantially wide vertical bore 28 is provided, which is continued in a transverse, preferably narrower bore 29, and a bore 30 is provided in the lower cross member 23 adapted to receive the lower end of the tube 14.

A connector member 31 is provided for the upper end of the device, having a screw threaded lower portion 32 fitting into the screw threaded upper part 33 of the bore 26, and the resilient rubber or similar bag 17 is secured on an appropriate upper part 34 of said connector member 31.

An inwardly opening check valve 35 is arranged at the upper end of the resilient bag 17, said valve being any of the well known constructions for such purpose, and permitting air to enter into the bag 17 when the same expands, but locking the exit for the air when the bag is compressed, as will easily be understood by those versed in this art.

The container bore 28 will have a transverse bore 36 starting from the top portion thereof and leading into the connector element 15 (Fig. 3) into which is sealingly secured the narrow tube 16, which leads to the liquid reservoir 37, as for instance, the distant fuel oil tank, and enters the same by a termination member 38, the fuel oil or other liquid therein being indicated at 39.

A great number of coils 40 are indicated in the narrow tube 16, since a certain length of the same is necessary for a better operation of the device, and usually it will have to have a certain length to reach the distant tank 37, and the usual great length of the tube 16 compared with the rest of the device, is indicated by the coils 40.

The use and operation of my device will be understood by those versed in this art from the description thereof.

The container 28 will be partly filled with a liquid 41 of heavy specific gravity, like mercury, part of which, obviously, will flow over into the tube 14, as indicated at 41a through the bore 29 and being balanced according to certain air pressure conditions defined by the height of the liquid or fuel oil 39 in the tank 37, and the height of the mercury column 41a in the tube 14 will have a definite relation to the height of the fluid 39 in the tank 37.

On the left side gauge proper 12 the height of liquid in the tank 37 is indicated in inches, as shown at 42, while on the right side gauge proper 13, the relative fullness of the tank 37 is indicated in eighths, as shown at 43.

It will be seen that when the tank 37 is filled with the liquid 39, like fuel oil, it will rise in the termination 38 of the small tube 16, and will compress the air in said tube to a proportionate degree. This pressure will extend into the mercury container 28 and will cause some mercury to flow over into the tube 14, the mercury column 41a therein being then higher and indicating in a pre-calculated manner, on the respective scales, the height of the fuel content of the tank 37 either in inches or in relation to the capacity of the full tank.

Now, as the fuel oil is consumed, its level will sink and it will permit the air in the narrow tube 16 to expand thereby reducing its pressure, whereupon the air pressure over the mercury in the container 28 will be reduced and the same will rise, reducing the height of the measuring mercury column 41a in the reading tube 14. In this manner, as will be seen, the respective scales 12 and 13 will at once show the condition of the liquid content of the tank 37.

It may happen that air, dirt, or liquid may get into the parts of the device, particularly into the long narrow tube 16, whereby the indication of it will be influenced and may not be true any more. In such cases pressure may be exerted on the resilient bag 17 at the top of the device whereby the air therein will be pressed into the tube 14 since the check valve 35 will prevent the exit of the air therethrough. The increased air pressure will drive the mercury 41a out of the tube 14 and the mercury column 41 in the container 25 will rise thereby exerting pressure on the air in the narrow tube 16, as will be obvious. This pressure will drive all the impurities, possible particles of liquid, etc., out of the tube 16 and down into the tank 37 whereupon the device will operate in a correct manner. The same procedure may be used when installing the device, the tank 37 being empty so that the pipe 16 and the communicating parts of the device will first be cleared through the repeated pressures and relaxation on the resilient bag 17.

As will be seen by observing the drawings, my device will have a vertical plain rear surface 50 whereby it may be placed against a wall or the like, in an efficient and easy manner, and it may have the upper and lower securing extensions or ears 51 having the apertures 52 therein through which a screw or other securing device may be employed to fasten my distant reading gauge on a wall or similar surface, at any desired place like in the kitchen or living room of a house, heated through the use of the fuel oil 39.

It also will be seen that the resilient bag 17 is arranged on the top of the device in such a manner that it will clear the wall on which the device will be secured and permit an easy operation of said resilient bag for the purpose described. Similarly, the connection 15 for the narrow tube 16 leading to the distant fuel oil tank, will be on the side of the device avoiding said wall or other support. My device, therefore, will permit an easy and efficient securing of the same and will permit access to the necessary operating parts of the device or such parts where the usual observation, removal and adjustment or repair may be necessary.

At the upper end of the indicator tube 14 I place a disk 53 of canvas or other appropriate sheet material, which permits a passage of the air therethrough, but will prevent the passage of the mercury, should the same somehow rise to that height, or if the device is placed in such a position as to permit the flowing of the mercury to said upper end. Above the canvas disk 53 I employ a perforated cork washer 54, so that when the element 31 is threaded downwardly to secure the glass tube 14, it will exert resilient yielding pressure thereon for obvious reasons. For the same reason, a perforated cork washer 55 is placed at the lower end of the tube 14.

At the inner end of the connecting member 15 (Fig. 3) I also place a canvas disk 56 to prevent the flowing over of the mercury into the narrow tube 16. A perforated metal washer 57 may be employed pressed into the inner opening of the member 15 to hold the canvas disk 56 in its place.

It will be obvious to those versed in this art, that various methods may be employed to assemble my device, particularly to set the reading tube 14 into the bores 26 and 30 in the frame of it. As an example, one such method may consist in having the upper transverse member 22 of the frame carrying the bore 26, as a separate piece being secured to the rest of frame by releasable means, like screws (not shown). Another method may consist in having the screw threaded bore 33 wider than bore 26 so that tube 14 may be dropped down through the bore 33 into its place in the device.

Having thus described my invention, what I claim as new and desire to protect by Letters Patent of the United States, is:

1. In a distant reading gauge for a closed liquid reservoir, a reading tube, a closure disk for the upper end of the tube, permeable to air but impermeable to a heavy fluid, like mercury, an indicating fluid container having a wider vertical leg and a narrow horizontal bore starting at the lower part of said leg, the lower end of said tube communicating with said horizontal bore, and being spaced apart from said leg, means to close the upper end of said leg, a narrow pipe leading from the upper part of said leg into said liquid reservoir adjacent to its bottom, a heavy fluid, like mercury, in said indicating fluid container, a closure disk permeable to air but impermeable to a heavy fluid for the opening of said pipe into said vertical leg, and an air pump communicating with the upper end of said reading tube adapted to blow air thereinto through said upper disk.

2. In a distant reading gauge for a closed liquid reservoir, a reading tube, a closure disk for the upper end of the tube, permeable to air but impermeable to a heavy fluid, like mercury, an indicating fluid container having a wider vertical leg and a narrow horizontal bore starting at the lower part of said leg, the lower end of said tube communicating with said horizontal bore, and being spaced apart from said leg, means to close the upper end of said leg, a narrow pipe leading from the upper part of said leg into said liquid reservoir adjacent to its bottom, a heavy fluid, like mercury, in said indicating fluid container, a closure disk permeable to air but impermeable to a heavy fluid for the opening of said pipe into said vertical leg, and an air pump communicating with the upper end of said reading tube adapted to blow air thereinto through said upper disk, said heavy indicating fluid being more than needed to fill said vertical leg, so that when it is caused by air pressure exerted thereon through said reading tube to move into and fill said leg, a portion of said fluid will remain in said horizontal bore and thereby prevent the air pumped into said reading tube to escape through said heavy fluid into the pipe leading to the liquid reservoir.

3. In a distant reading gauge for a closed liquid reservoir, a reading tube, a closure disk for the upper end of the tube, permeable to air but impermeable to a heavy fluid, like mercury, an indicating fluid container having a wider vertical leg and a narrow horizontal bore starting at the lower part of said leg, the lower end of said tube communicating with said horizontal bore, and being spaced apart from said leg, means to close the upper end of said leg, a narrow pipe leading from the upper part of said leg into said liquid reservoir adjacent to its bottom, a heavy fluid, like mercury, in said indicating fluid container, a closure disk permeable to air but impermeable to a heavy fluid for the opening of said pipe into said vertical leg, and an air pump communicating with the upper end of said reading tube adapted to blow air thereinto through said upper disk, a frame for said gauge, having a vertical member and respective transverse members at the upper and lower ends thereof, coaxial bores in said transverse members to receive the ends of said reading tube, said vertical leg and said horizontal bore of the indicating fluid container being arranged in said lower transverse member.

4. In a distant reading gauge for a closed liquid reservoir, a reading tube, a closure disk for the upper end of the tube, permeable to air but impermeable to a heavy fluid, like mercury, an indicating fluid container having a wider vertical leg and a narrow horizontal bore starting at the lower part of said leg, the lower end of said tube communicaing with said horizontal bore, and being spaced apart from said leg, means to close the upper end of said leg, a narrow pipe leading from the upper part of said leg into said liquid reservoir adjacent to its bottom, a heavy fluid, like mercury, in said indicating fluid container, a closure disk permeable to air but impermeable to a heavy fluid for the opening of said pipe into said vertical leg, and an air pump communicating with the upper end of said reading tube adapted to blow air thereinto through said upper disk, a frame for said gauge, having a vertical member and respective transverse members at the upper and lower ends thereof, coaxial bores in said transverse members to receive the ends of said reading tube, said vertical leg and said horizontal bore of the indicating fluid container being arranged in said lower transverse member, a throughgoing pipe in the bore for the upper end of said reading tube, projecting above the top of said upper transverse member, said air pump being in the form of a resilient bulb secured on the upper end of said throughgoing pipe, communicating therewith and having a normally closed valve adapted to open inwardly when partial vacuum is produced in said bulb.

5. In a distant reading gauge for a closed liquid reservoir, a reading tube, a closure disk for the upper end of the tube, permeable to air but impermeable to a heavy fluid, like mercury, an indicating fluid container having a wider vertical leg and a narrow horizontal bore starting at the lower part of said leg, the lower end of said tube communicating with said horizontal bore, and being spaced apart from said leg, means to close the upper end of said leg, a narrow pipe leading from the upper part of said leg into said liquid reservoir adjacent to its bottom, a heavy fluid, like mercury, in said indicating fluid container, a closure disk permeable to air but impermeable to a heavy fluid for the opening of said pipe into said vertical leg, and an air pump communicating with the upper end of said reading tube adapted to blow air thereinto through said upper disk, a frame for said gauge, having a vertical member and respective transverse members at the upper and lower ends thereof, coaxial bores in said transverse members to receive the ends of said reading tube, said vertical leg and said horizontal bore of the indicating fluid container being arranged in said lower transverse member, said air pump being in the form of a resilient bulb, communicating with the upper end of said reading tube, said frame having rearward extensions terminating in a vertical plane and means to suspend the gauge on a vertical support by said extensions whereby said bulb will be spaced apart from said support and may be conveniently operated on the device when desired.

NATHAN MARCUS.

REFERENCES CITED

The following references are of record in the file of this patent:

UNITED STATES PATENTS

| Number | Name | Date |
|---|---|---|
| 824,532 | Dunn | June 26, 1906 |
| 992,612 | Stanton | May 16, 1911 |
| 1,195,736 | Rohn | Aug. 22, 1916 |
| 1,394,031 | Lundin | Oct. 18, 1921 |
| 1,396,273 | Miller et al. | Nov. 8, 1921 |
| 1,399,205 | Frey | Dec. 6, 1921 |
| 1,619,919 | Cook | Mar. 8, 1927 |
| 1,642,615 | Lommel | Sept. 13, 1927 |
| 1,900,774 | Star | Mar. 7, 1933 |
| 2,012,511 | Hubbard | Aug. 27, 1935 |

FOREIGN PATENTS

| Number | Country | Date |
|---|---|---|
| 131,837 | Great Britain | Sept. 4, 1919 |